United States Patent

[11] 3,596,290

| [72] | Inventor | Francis B. Kennedy<br>3000 N. Romero Road, A-6, Tucson, Ariz. 85705 |
|---|---|---|
| [21] | Appl. No. | 757,602 |
| [22] | Filed | Sept. 5, 1968 |
| [45] | Patented | Aug. 3, 1971 |

[54] SIDE GLARE SPECTACLE VISOR
2 Claims, 6 Drawing Figs.

[52] U.S. Cl. .................................................. 2/13
[51] Int. Cl. .................................................. A61f 9/08
[50] Field of Search ........................................... 2/12, 13,
14.1, 14.4, 14.5, 14.8, 14.9, 14.14, 14.15, 14.16,
14.20, 14.21

[56] References Cited

UNITED STATES PATENTS

| 422,001 | 2/1890 | Wilson ......................... | 2/13 |
| 2,224,784 | 12/1940 | Goldschmid et al. ......... | 2/13 |
| 2,634,416 | 4/1953 | Fehrs ........................... | 2/14.21 X |
| 2,858,539 | 11/1958 | Carlson ....................... | 2/13 |
| 3,204,252 | 9/1965 | Herrington .................. | 2/13 |

FOREIGN PATENTS

| 198,973 | 8/1958 | Austria ....................... | 2/13 |

*Primary Examiner*—H. Hampton Hunter
*Attorney*—James A. Eyster

ABSTRACT: A thin sheet of moderately transparent material is provided with a spring clip for fastening the sheet to one temple of a pair of spectacles.

PATENTED AUG 3 1971  3,596,290

INVENTOR.
FRANCIS B. KENNEDY
BY
James A. Eyster
Agent

SIDE GLARE SPECTACLE VISOR

This invention relates to devices for protecting the eyes from glare.

The driver of an automobile can be annoyed by direct sunlight shining through his left side window. Such sun glare may also irritate his eyes and distract his attention. In some diseased conditions of the eyes such glare is intolerable.

The present invention eliminates side glare while driving an automobile by providing an easily and quickly attachable and detachable shield secured to either temple of a pair of spectacles. This eliminates glare yet, being somewhat transparent, enables the driver, by peripheral vision, to perceive movement at his left such as of a car in the left lane.

In diseased conditions of the eyes, two such visors can be simultaneously worn, one on each spectacle temple.

One purpose of this invention is to provide a shield or visor to eliminate glaring side light from the sun or other source.

Another purpose of this invention is to provide such a visor which does not preclude the use of peripheral vision.

Still another purpose of this invention is to provide a visor which is quickly and easily attachable and detachable to either temple of a pair of spectacles of either the prescription type or the dark glass type.

A better understanding of the invention can be secured by reference to the following detailed description and the drawing, in which.

Figure 1:
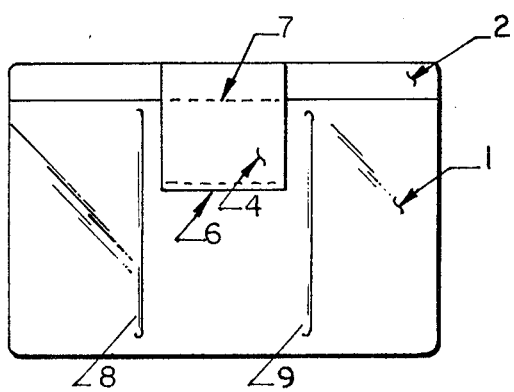
FIG. 1 is a view of the reverse side of the visor.
Figure 2:
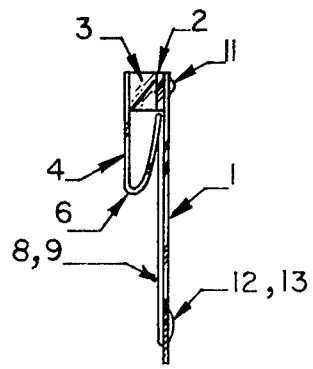
FIG. 2 is a view of the edge of the visor.
Figure 3:
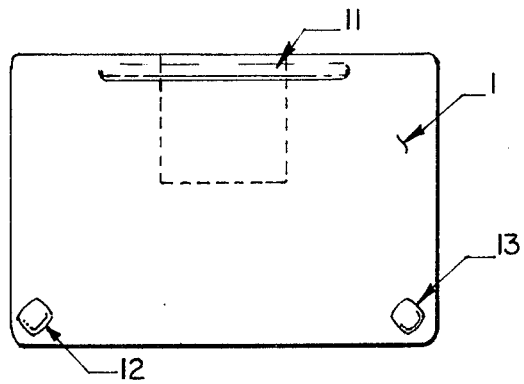
FIG. 3 is a view of the obverse side of the visor.

Referring now to FIGS. 1, 2 and 3, a sheet 1 of thin plastic, with rounded corners, is somewhat transparent, similar to the lenses of a pair of dark glasses, so that some light is transmitted but is reduced in intensity, yet objects can be seen and identified by looking through the sheet.

The sheet 1 is provided on the reverse side along its upper edge with a raised strip 2, of a thickness comparable to the thickness of a spectacle temple. In or near the middle of the strip it is provided with a spacer block 3 extending along the length of the strip and thicker than the strip. Both the strip 2 and the spacer block 3 can be made integral with the sheet 1, as by molding, or built up by securing separate pieces to the sheet, or formed by pressing the sheet 1 into raised portions.

A spring clip 4 is made of springy material such as plastic sheet or metal sheet, with a smooth surface of composition and texture which will not scratch a plastic or soft metal temple. The clip 4 is secured to or integral with the spacer block 3, extending downward and turned inward at 6 toward sheet 1 and upward, so that the free edge of clip 4 touches the sheet 1 at or near its junction 7 with strip 2.

The reverse side of sheet 1 is provided on its surface with two slightly raised ridges, 8 and 9, extending from at or near strip 2 in a direction perpendicular thereto toward or to the bottom edge of the sheet.

The obverse side of the sheet is provided with a slightly raised ridge, 11, extending along its surface at or near its top edge, and two slightly raised knobs or protuberances, 12 and 13, at or near its two lower corners.

In the use of the side glare spectacle visor, one visor is clipped to the left side of a pair of spectacles provided with temples or sidepieces which extend along the temples of the head and over the ears. The visor is placed with the obverse side out, away from the head, and the strip 2 horizontal, parallel with the temple and above the temple. The lower edge of the strip rests on the upper edge of the temple so that the weight of the visor is supported, through the strip, by the temple. In the operation of putting the visor on the temple, the latter is forced upward between the spring clip and the sheet, pushing the clip away from the sheet. The wearer need use only one hand for this easy operation. After he pushes the temple up until it touches strip 2, the spring clip pressing against the temple holds it in place.

Figures 4, 5:
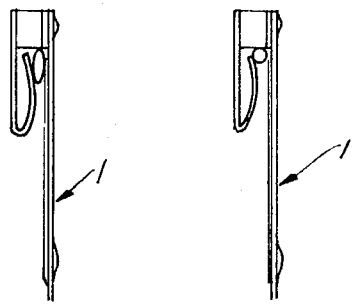
FIG. 4 is a view showing the visor clipped to a large plastic temple.
FIG. 5 is an edge view showing the visor clipped to a wire temple.
Figure 6:
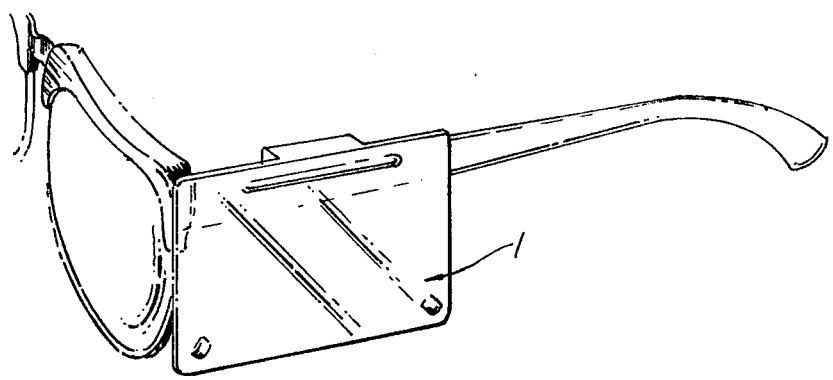
FIG. 6 is a perspective view showing the visor in use, clipped to the temple of a pair of spectacles.

The spring clip is so positioned and has such a degree of resilience that it holds the visor equally well to a plastic temple, as shown in FIGS. 4 and 6, or to a wire temple, as shown in FIG. 5.

Similarly, the same or a second visor may be placed on the right side of the spectacles, with the obverse side out and away from the head.

When the visor is being positioned on a pair of spectacles and the temple is being slid upward to engage the spring clip, the ridges 8 and 9 on the reverse side of sheet 1 prevent contact of the temple with the reverse side of the sheet, which might be scratched by contact and its transparency impaired. The ridges also prevent scratching of a plastic temple by the visor. These ridges thus function only during positioning of the shield on the spectacle temple and have no function afterward while the user is wearing the device.

When the visor is not secured to a pair of spectacles the visor is likely to be laid on a flat surface. In such case, if the visor is laid with the obverse side down, the ridge 11 and protuberances 12 and 13 prevent contact of the obverse surface with any dust or grit which could scratch the surface and impair its transparency.

What I claim is:

1. The combination of a pair of spectacles having temples and a sheet of homogeneous material with a light transmissibility in the range between complete transparency and complete opacity and excluding both extremes of complete transparency and complete opacity, together with clip means for securing the sheet to one temple of the spectacles, a strip secured to one side of said sheet, the strip having its inner edge parallel and adjacent to one edge of the sheet, the inner edge of said strip constituting a surface having a width substantially of the thickness of a temple; a spacer block secured to said strip; said clip means including a spring clip made of springy material secured to said spacer block, and said springy material having a soft surface, thereby being incapable of scratching a plastic temple and at least a pair of low ridges on the surface of said sheet on the same side thereof as said clip, said ridges extending out of the plane of said sheet generally perpendicular thereto, whereby mutual scratching between the reverse surface of the sheet and the temple is prevented.

2. A combination as described in claim 1 including at least three projections on the surface of said sheet on the side thereof opposite to the side carrying said clip sheet, whereby scratching of the obverse surface of the sheet when laying it on a horizontal surface is prevented.